US007280919B2

(12) United States Patent
Yomoda et al.

(10) Patent No.: US 7,280,919 B2
(45) Date of Patent: Oct. 9, 2007

(54) EARTHQUAKE PREDICTION METHOD AND SYSTEM THEREOF

(75) Inventors: Tomonari Yomoda, Yokohama (JP); Toshio Yoshida, Yokohama (JP)

(73) Assignee: Nec Mobiling, Ltd., Kanagawa (JP)

( * ) Notice: Subject to any disclaimer, the term of this patent is extended or adjusted under 35 U.S.C. 154(b) by 0 days.

(21) Appl. No.: 10/529,757

(22) PCT Filed: Aug. 18, 2004

(86) PCT No.: PCT/JP2004/011818

§ 371 (c)(1), (2), (4) Date: Mar. 30, 2005

(87) PCT Pub. No.: WO2005/022198

PCT Pub. Date: Mar. 10, 2005

(65) Prior Publication Data

US 2005/0280421 A1 Dec. 22, 2005

(30) Foreign Application Priority Data

Aug. 27, 2003 (JP) ............................. 2003-302633

(51) Int. Cl.
*G01V 1/00* (2006.01)
*G01V 3/00* (2006.01)
(52) U.S. Cl. ...................................................... 702/15
(58) Field of Classification Search ................. 702/15, 702/14, 2, 5, 7
See application file for complete search history.

(56) References Cited

U.S. PATENT DOCUMENTS

| 4,612,506 | A | * | 9/1986 | Varotsos et al. ............. 324/348 |
| 5,148,110 | A | * | 9/1992 | Helms ......................... 324/323 |
| 5,742,166 | A | * | 4/1998 | Park ............................ 324/344 |
| 5,811,974 | A | * | 9/1998 | Hata ........................... 324/344 |
| 6,100,697 | A | * | 8/2000 | Park ............................ 324/344 |
| 6,622,093 | B1 | * | 9/2003 | Fujinawa et al. .............. 702/15 |
| 6,859,416 | B2 | * | 2/2005 | Inubushi ....................... 367/14 |

FOREIGN PATENT DOCUMENTS

| JP | 1-094286 A | 4/1989 |
| JP | 9-26478 A | 1/1997 |
| JP | 9-105781 A | 4/1997 |
| JP | 10-319128 A | 12/1998 |
| JP | H11-258353 A | 9/1999 |
| JP | 2001-344285 A | 12/2001 |

(Continued)

*Primary Examiner*—Donald E McElheny, Jr.
(74) *Attorney, Agent, or Firm*—Sughrue Mion Pllc.

(57) ABSTRACT

Vehicles or ships each carry a magnetic force line sensor, a GPS position detector, and a data transmitter and travel within an observation area transmitting magnetic field data and position data to an earthquake prediction center. A telluric current induction field estimation unit of the earthquake prediction center estimates telluric current induction fields based on the received observation data. A telluric current estimation unit estimates telluric currents based on the results of estimating the telluric current induction fields. A telluric current induction field intensity change pattern generation unit generates patterns indicating the change over time of the intensity of telluric current induction fields. An earthquake prediction unit analyzes the state of distribution of the telluric currents and the patterns of change in the intensities of the telluric current induction fields and estimates a seismofocal zone, seismic intensity, and time of occurrence of a seismic event.

8 Claims, 6 Drawing Sheets

FOREIGN PATENT DOCUMENTS

| | | |
|---|---|---|
| JP | 2002-122674 A | 4/2002 |
| JP | 2002-250775 A | 9/2002 |
| JP | 2002-267762 A | 9/2002 |
| JP | 2003-042834 A | 2/2003 |
| JP | 2003-043153 A | 2/2003 |
| JP | 2003-215259 A | 7/2003 |

* cited by examiner

EARTHQUAKE PREDICTION METHOD AND SYSTEM THEREOF

This application claims priority from PCT Application No. PCT/JP04/11818 filed Aug. 18, 2004, and from Japanese Patent Application No. 2003-302633 filed Aug. 27, 2003, which applications are incorporated herein by reference.

TECHNICAL FIELD

The present invention relates to an earthquake prediction method and system, and more particularly to an earthquake prediction method and system for measuring the magnetic field of each point within an observation area to predict earthquakes.

BACKGROUND ART

The Japanese archipelago is situated on volcanic chains, and the occurrence of a massive earthquake disaster is therefore a major concern in the oceans to the east, southeast and south, not to mention throughout the archipelago. To protect the lives and property of citizens from earthquake disasters, more suitable measures must be taken not only for systems for recovery following an earthquake, but for earthquake prediction, and for this purpose, the establishment of a low-cost, and moreover, highly accurate and effective earthquake prediction technology is urgently required.

From ancient times, many examples of precursors of impending earthquakes have been reported, such as the agitated behavior of catfish or the increased activity of rats. In addition, several days before the Great Hanshin-Awaji (Kobe) Earthquake and Fire of January 1995, local amateur radio operators observed radio-wave abnormalities, and a phenomenon known as an "earthquake cloud" was witnessed by many people.

It is believed that the occurrence of such radio-wave abnormalities and "earthquake clouds" result from some form of influence of telluric currents that are in turn generated by the piezoelectric effect resulting from the collision of tectonic plates.

The prediction of earthquakes by observing the amount of rotation of a permanent magnet that is suspended from a thread has been disclosed (for example, in Japanese Patent Laid-Open Publication No. H11-258353).

However, the prediction of earthquakes with high accuracy by observing changes in telluric current would necessitate the establishment of a large number of closely-spaced observation facilities over an extensive observation area. As an example, earthquake prediction in the eastern seaboard region of Japan would require an observation system covering several hundred kilometers square.

With the current financial difficulties faced by national and municipal governments, such an establishment of a large number of observation facilities would be a tremendous burden, and the costs for maintaining and operating the observation system would render the realization of such a system highly problematic.

DISCLOSURE OF THE INVENTION

It is an object of the present invention to provide an earthquake prediction method and system for collecting magnetic field data at numerous points within an observation area at low cost, and moreover, within a short time period to thus enable accurate earthquake prediction.

In the earthquake prediction method of the present invention, magnetic fields are measured at various points within an observation area to both estimate telluric current induction fields and to thus estimate telluric currents; and the state of the telluric currents within the observation area and the change of the telluric currents over time are then analyzed to estimate a seismofocal zone, a time of occurrence of a seismic event, and seismic intensity.

In addition, a magnetic field noise component is eliminated from the observed magnetic fields, the amount of divergence of the direction of the magnetic fields from the direction of true north at observation points from which this magnetic field noise component has been eliminated is found, the telluric current induction fields are then estimated based on the vector difference between the observed magnetic fields from which the magnetic field noise component has been eliminated and a geomagnetic vector that has been corrected to true north.

Further, the estimated telluric current induction fields are plotted on a map; the telluric currents are estimated by both joining points on the map at which geomagnetic abnormalities are noted and applying the right-handed screw rule; and the region in which the estimated telluric current is concentrated is estimated to be a seismofocal zone.

Still further, past data of telluric current induction field intensities at specific observation points are gathered and a telluric current induction field intensity change pattern that indicates changes over time is generated; and this pattern is then compared and collated with past telluric current induction field intensity change patterns that have been stored to estimate the time of occurrence and seismic intensity of a seismic event.

The earthquake prediction system of the present invention is provided with: mobile units such as vehicles or ships, each unit carrying a magnetic force line sensor for supplying as output magnetic field data that indicate the direction and intensity of lines of magnetic force, a GPS position detector for receiving radio waves of a GPS satellite and supplying as output position data that indicate position, and a data transmitter for transmitting these data; and an earthquake prediction center for collecting these data of various points that are transmitted by the mobile units that travel within an observation area and for then implementing earthquake prediction.

In addition, the earthquake prediction center includes: a data receiver for receiving data that have been transmitted from the mobile units by way of a communication network and an antenna; a data storage unit for retaining and storing various data such as map data and data that have been received by this data receiver; a telluric current induction field estimation unit for estimating telluric current induction fields based on map data and data that have been retained and stored in this data storage unit; a telluric current estimation unit for estimating telluric currents based on the telluric current induction fields that have been estimated; a telluric current induction field intensity change pattern generation unit for accumulating transitions over time of the telluric current induction field intensities and then generating change patterns; and an earthquake prediction unit for analyzing the telluric currents that have been estimated and the change patterns of the telluric current induction field intensities to estimate a seismofocal zone, seismic intensity, and time of occurrence of a seismic event.

Alternatively, when a mobile unit is provided with a car navigation system, the position data of the car navigation system may be used instead of data from a GPS position detector.

In addition, magnetic force line sensors and communication equipment may be installed in preselected existing fixed structures within the observation area, and the communication equipment may transmit the magnetic field data output of the magnetic force line sensors and information indicating the installation positions to the earthquake prediction center by way of an existing communication network.

Further, a magnetic force line sensor and GPS position detector may be incorporated in, for example, a mobile telephone, and the mobile telephone may use its own communication capabilities to transmit observation data to the earthquake prediction center.

Still further, acceleration sensors may be provided in existing fixed structures such that magnetic field data are transmitted when the acceleration sensors detect earthquake motion; or acceleration sensors may be provided in mobile units or in mobile telephones such that magnetic field data are transmitted when an acceleration sensor detects a stationary state of at least a fixed time interval.

According to the present invention, by installing magnetic force line sensors, GPS position detectors, and data transmitters in, for example, vehicles or ships that travel within an observation area, collecting at an earthquake prediction center the magnetic field data at each point within the observation area, and analyzing the telluric current induction fields and telluric currents that are estimated based on the magnetic field data, accurate earthquake prediction can be realized at a low equipment cost without necessitating the installation of measurement equipment at a multiplicity of points.

In addition, by establishing magnetic force line sensors at preselected existing structures within an observation area and then transmitting magnetic data to an earthquake prediction center by way of an existing communication network, or alternatively, by establishing magnetic force line sensors in devices such as a mobile telephones and then transmitting magnetic data to the earthquake prediction center, the observation data of a multiplicity of points within an observation area can be collected at a low equipment cost to realize accurate earthquake prediction.

Further, the installation of a magnetic force line sensor together with an acceleration sensor whereby observation data are automatically transmitted when the acceleration sensor detects earthquake motion enables the collection of magnetic field data at the time of the occurrence of foreshocks that precede a main shock and thus allows observation data to be obtained that are effective in earthquake prediction.

BEST MODE FOR CARRYING OUT THE INVENTION

Explanation next regards the present invention with reference to the accompanying figures.

Figure 1:
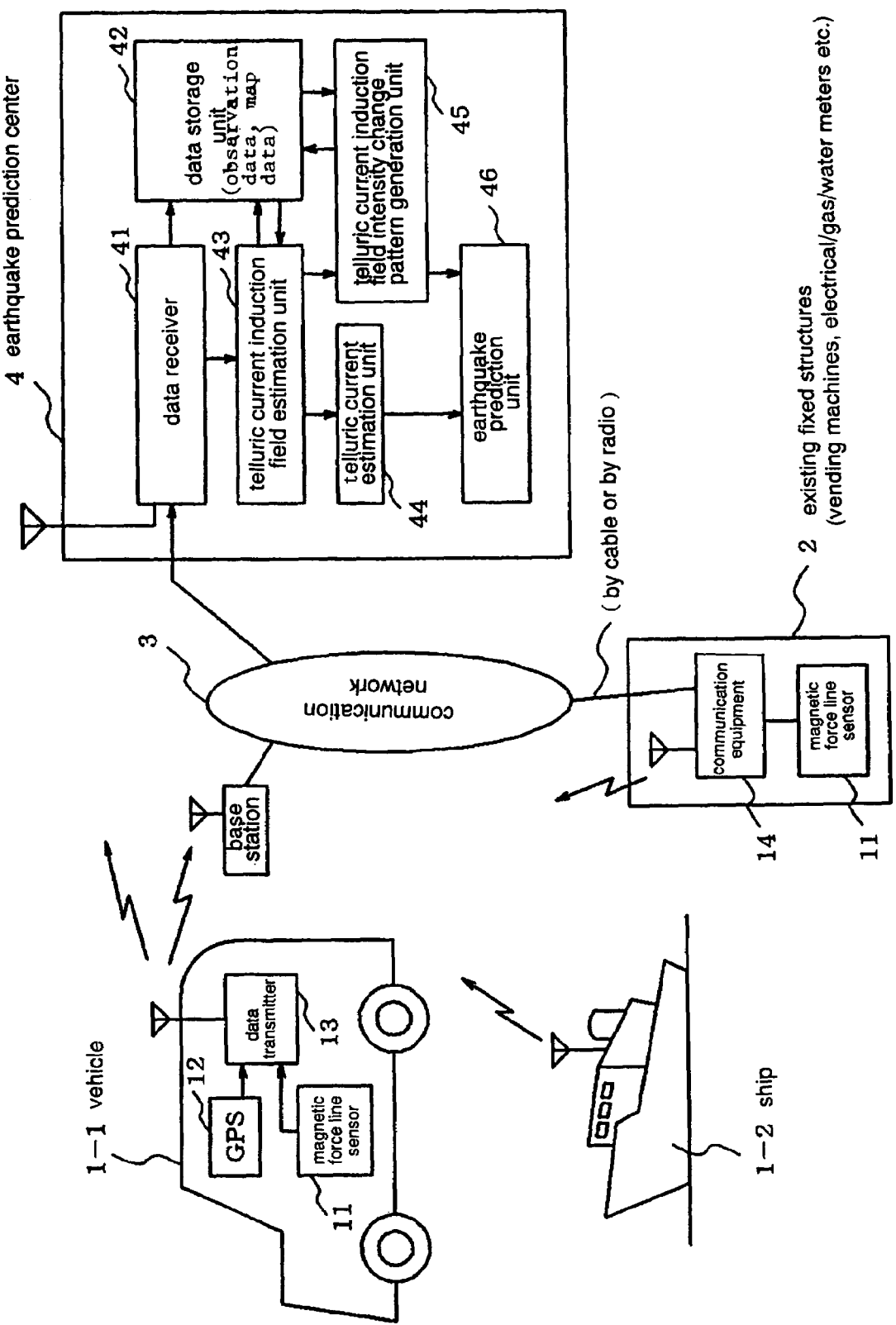
FIG. 1 is a block diagram showing an embodiment of the present invention.

FIG. 1 is a block diagram showing an embodiment of the present invention, and shows an earthquake prediction system that uses: mobile units 1 such as a vehicle or a ship that are capable of movement on land or on sea; or existing fixed structures 2 that have been selected in advance within the observation area, to collect observation data at a multiplicity of points within the observation area and predict, for example, the seismofocal zone and time of occurrence of an earthquake.

In this case, the earthquake prediction system is provided with: mobile unit 1 in which, for example, magnetic force line sensor 11 and GPS position detector 12 are mounted and which transmits observation data to earthquake prediction center 4; existing fixed structure 2 in which magnetic force line sensor 11 and communication equipment 14 have been installed; communication network 3 for transmitting observation data to earthquake prediction center 4; and earthquake prediction center 4 for predicting earthquakes based on the observation data of a multiplicity of points within the observation area.

Mobile unit 1 is vehicle 1-1 or ship 1-2 that moves within the observation area and that carries: magnetic force line sensor 11 that supplies magnetic field data that indicate the intensity and direction of a line of magnetic force; GPS position detector 12 that receives radio waves of a GPS satellite and that supplies position data; as well as data transmitter 13 that transmits observation data to earthquake prediction center 4.

When the mobile unit carries a car navigation system, the position data of the car navigation system can be used and GPS position detector 12 can therefore be omitted.

The observation data may be transmitted in real time, or a data storage apparatus may be provided for recording the observation data. It goes without saying that the observation data may also include, in addition to magnetic field data and position data, data indicating the observation time.

Setting the observation data for automatic transmission at observation positions and times that have been set in advance allows a reduction of the burden imposed on human operators.

In addition, effective observation data can be obtained if the entire observation area is observed by mesh coverage. Mesh coverage is a covering method that is frequently used in radio-wave checks for mobile telephones and involves preparing a map in advance of the region that is to be covered, casting lines in a mesh pattern, and then traveling in a mesh pattern along these lines.

Existing fixed structures 2 that can be considered include: electrical/gas/water meters that are established in each residence and business; vending machines that are established along roads; poles for power lines and communication lines; poles for traffic signals; operation display apparatus that is installed at bus stops; and further, the buildings of mobile telephone base stations and PHS base stations.

Communication equipment 14 transmits either by cable or by radio to earthquake prediction center 4 the magnetic field data that are supplied as the output of magnetic force line sensor 11 along with information indicating the position of installation.

In this case, transmission may be carried out in real time, or transmission may be implemented automatically at predetermined observation times.

The data transmission path can be easily secured when already existing fixed structure 2 is a pole for power lines or communication lines, a pole for a traffic signal, or the building of a mobile telephone base station or PHS base station. In addition, lower costs can be obtained if an existing wireless communication means such as an emergency radio system is used.

When an installation such as an electrical/gas/water meter is used, the automatic meter reading system may be used for transmission. If the operation display apparatus that is installed at a bus stop is used, the vehicle operation management system may be used for transmission. Further, if vending machines are used, a system may be constructed for transmitting the sales or stock information of the vending machines along with the magnetic field data.

Communication network 3 is an existing communication network such as a mobile communication network that includes base stations or a satellite communication network that transmits by way of communication satellites.

Earthquake prediction center 4 includes: data receiver 41 for receiving observation data by way of communication network 3 and an antenna; data storage unit 42 for retaining and storing various data such as observation data and map data; telluric current induction field estimation unit 43 for estimating telluric current induction fields based on the observation data and map data that are retained and stored in data storage unit 42; telluric current estimation unit 44 for estimating the telluric currents based on the results of estimating the telluric current induction field; telluric current induction field intensity change pattern generation unit 45 for accumulating transitions of the telluric current induction field intensity over time and generating change patterns; and earthquake prediction unit 46 for analyzing the estimation results for telluric currents and the change patterns of the telluric current induction field intensity and then predicting the seismofocal zone, the seismic intensity, and the time of occurrence of an earthquake.

Figure 2:
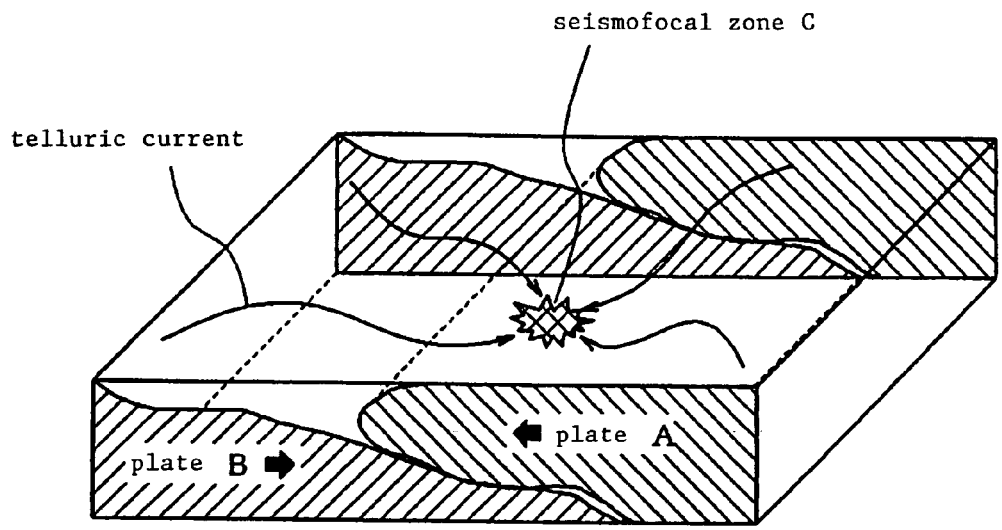
FIG. 2 is a view showing a model of telluric current in the vicinity of a seismofocal zone preceding the occurrence of an earthquake.

FIG. 2 shows a model of telluric current in the vicinity of seismofocal zone of an earthquake preceding the occurrence of the earthquake.

In this case, plate A and plate B are moving in mutually colliding directions and thus press against each other. Point C at which the local pressure in the boundary plane between plate A and plate B is building is the seismofocal zone.

At this seismofocal zone C, massive stress is concentrated and an extremely high-stress state is in effect, and this stress gradually rises with movement of the plates. During this state, it is assumed that voltage is generated by the piezoelectric effect in seismofocal zone C, and that charge within the rock mass flows into seismofocal zone C.

It is further assumed that the flow of charge within the rock mass (telluric current) follows points having good conductivity within the rock mass and flows from each direction like rivers. Normally, since most seismofocal zones are underground, most of the charge flows underground and it is assumed that the charge rarely flows on the earth's surface.

It is hypothesized that immediately before the rock mass of seismofocal zone C fractures, the telluric currents rise with increasing speed, and simultaneously with the fracturing of the rock mass, the piezoelectric voltage vanishes with the release of stress and the telluric currents instantly disappear.

The telluric currents therefore occur and change as a precursor of an earthquake, and observation of the direction and intensity of the telluric currents therefore enables prediction of an earthquake.

Since telluric currents do not flow on the earth's surface, direct detection of these currents is problematic, but induction fields that are caused by telluric currents (telluric current induction fields) do occur on the surface, and detection of the direction and intensity of magnetic fields on the surface therefore enables prediction of the direction and intensity of a telluric current induction field.

The simplest method of observing a telluric current induction field is to observe the direction indicated by a magnetic needle. Under the influence of a telluric current induction field, a magnetic needle indicates a direction that diverges from the direction of normal terrestrial magnetism, and in an environment that is free of magnetism other than terrestrial magnetism and the telluric current induction field, a magnetic needle therefore enables the simplest and most economical observation.

A second method allows more precise observation than a magnetic needle through the use of a magnetic force line sensor.

A third method enables even greater accuracy by combining the use of a magnetic force line sensor and a GPS position detector.

Alternatively, the combined use of a magnetic needle and a GPS position detector can obtain effective data for earthquake prediction. North as indicated by a magnetic needle does not align with true north, and it is further well known that this magnetic north shifts slightly every year. Thus, true north is found by means of a GPS satellite, and through constant observation of the difference from north as indicated by a magnetic needle, effective data for earthquake prediction can be obtained.

However, in order to raise the accuracy of observation data of telluric current induction fields, the magnetic field noise component that is generated by factors other than telluric current must be eliminated from the observation data.

Magnetic field noise that occurs due to factors other than telluric current principally arises from the following sources:

Magnetic fields that are generated by the direct current that flows in overhead power lines at observation points that are close to railway lines. Changes in such magnetic fields are characteristically short-term micro-changes, with the intensity of the magnetic field increasing as a train approaches and decreasing as a train moves away.

Geomagnetic storms caused by the Dellinger phenomenon that accompanies solar activity. These disturbances characteristically occur and disappear in short time intervals.

Magnetic fields that occur due to subterranean metal ores. These fields are characterized by constant fixed levels.

In order to eliminate the magnetic field noise component that is produced by such factors other than telluric current, the magnetic field can be observed at fixed intervals at fixed observation points, the characteristics of the change patterns in these magnetic fields analyzed, and the magnetic field noise component then extracted and removed by software.

Figure 3:
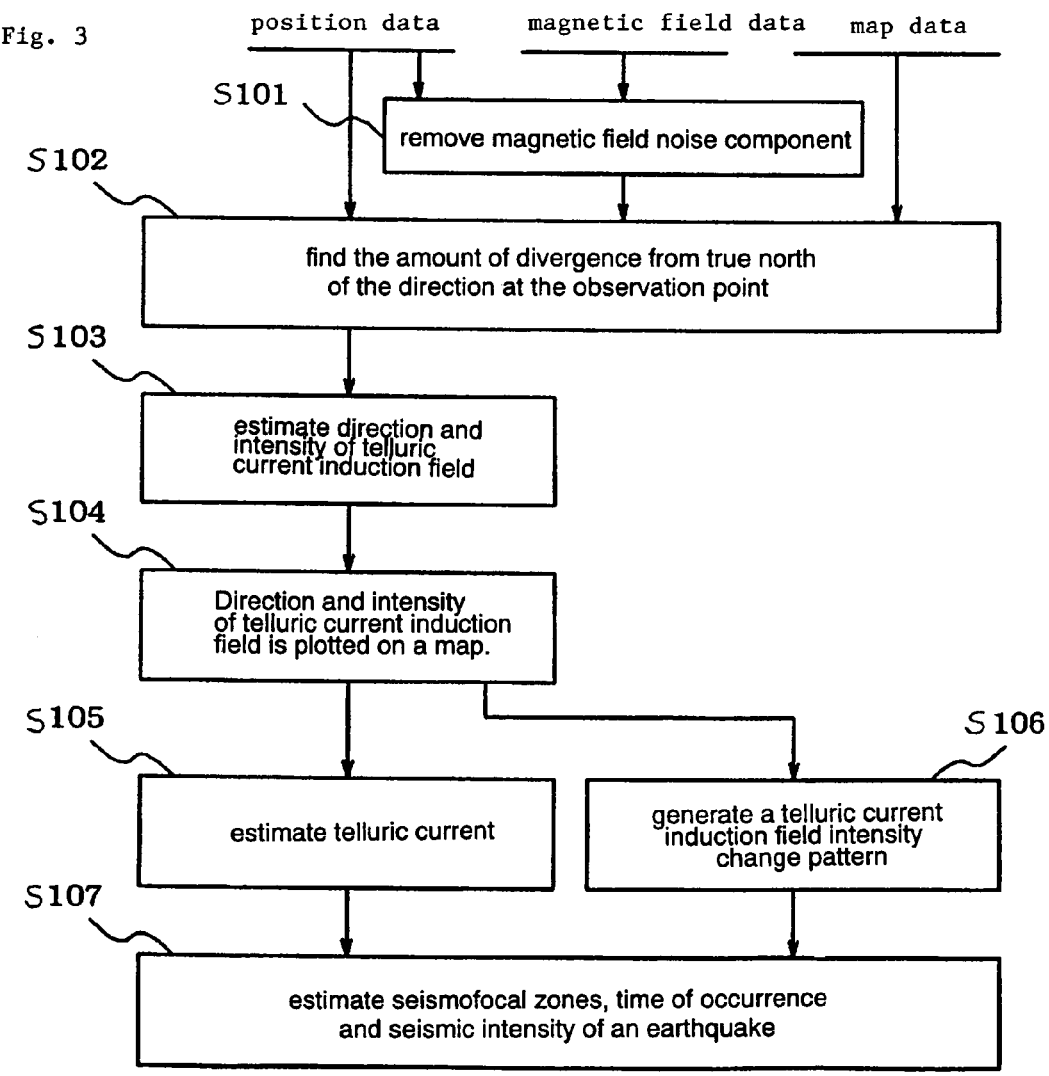
FIG. 3 shows the earthquake prediction operation of earthquake prediction center 4 that is shown in FIG. 1.

FIG. 3 shows the earthquake prediction operations of earthquake prediction center 4.

Figure 4:
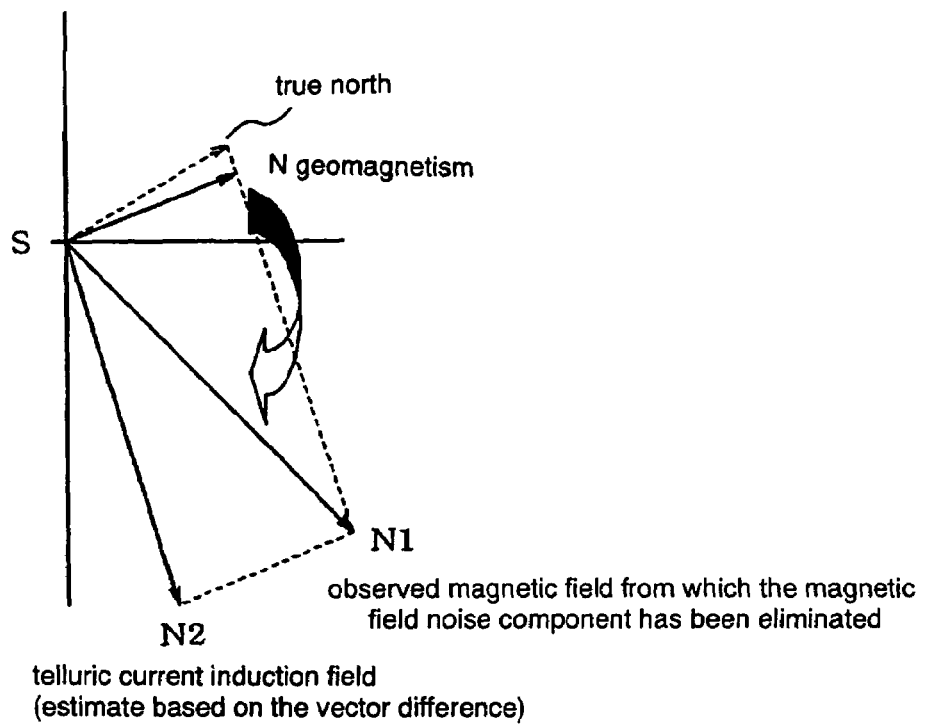
FIG. 4 shows the estimation of a telluric current induction field.

First, telluric current induction field estimation unit 43: removes the magnetic field noise component at the observation point from observed magnetic field data (Step 101);

then, as shown in FIG. 4, finds the amount of divergence from true north of the direction of the magnetic field at the observation point, from which the magnetic field noise component has been eliminated (Step 102); and estimates telluric current induction field N2 based on the vector difference between observed magnetic field N1 from which the magnetic field noise component has been eliminated and geomagnetic vector N that has been corrected to true north (Step 103). Then, as shown in FIG. 5, the results are plotted on a map (Step 104).

Figure 5:
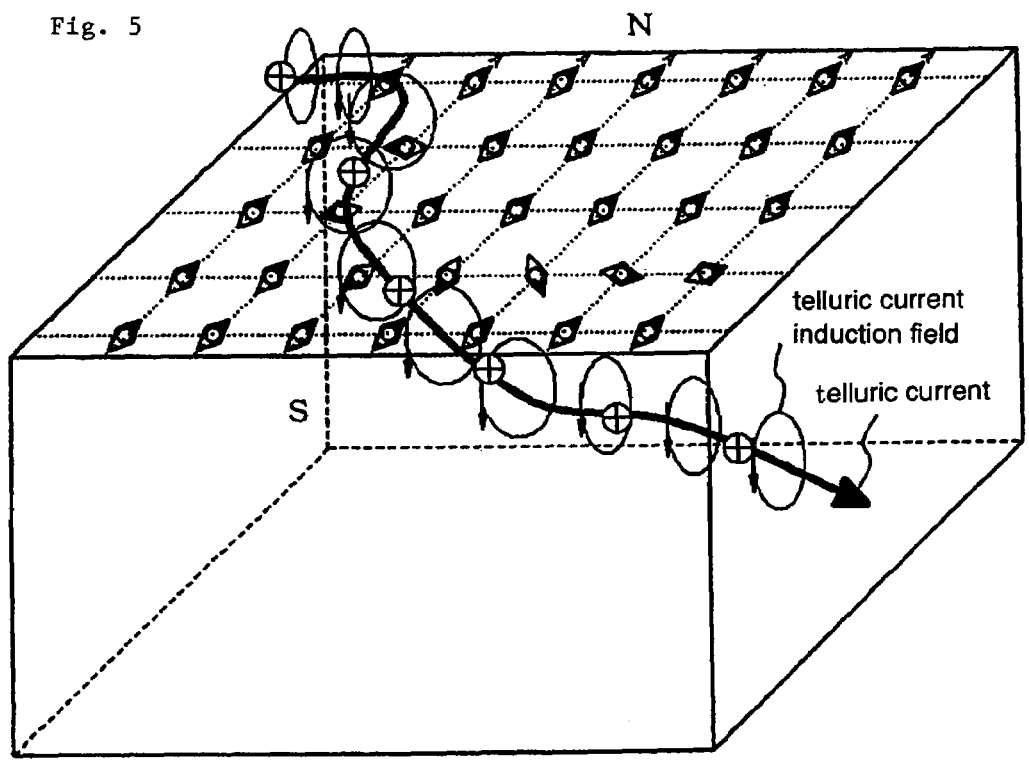
FIG. 5 shows an example of the estimation of a telluric current.

Telluric current estimation unit 44 next connects the points on a map at which abnormalities in terrestrial magnetism have been recognized as shown in FIG. 5, and further, estimates the telluric current based on the right-handed screw rule (Step 105).

Telluric current induction field intensity change pattern generation unit 45 collects past data of the telluric current induction field intensities at specific observation points and generates a telluric current induction field intensity change pattern that shows change over time (Step 106).

Earthquake prediction unit 46 analyzes the telluric current induction field intensity change patterns and the distribution of telluric currents that have been estimated by telluric current estimation unit 44, searches for unnatural regions such as points where the telluric currents are concentrated, and thus estimates seismofocal zones. Earthquake prediction unit 46 further compares and collates the telluric current induction field intensity change pattern that has been generated with past telluric current induction field intensity change patterns to estimate the time of occurrence and seismic intensity of an earthquake (Step 107).

Figure 6:
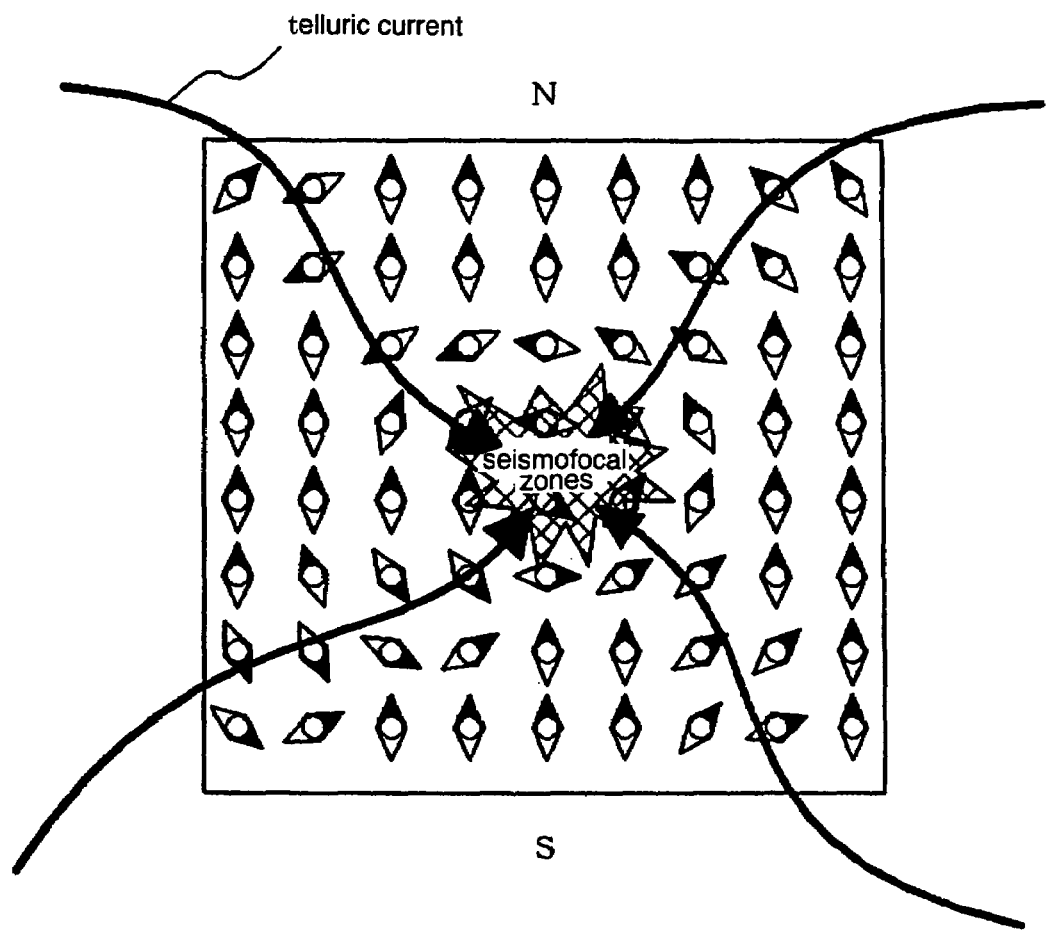
FIG. 6 shows an example of telluric current induction fields and telluric currents that have been measured.

As an example, when telluric current induction fields and telluric currents are plotted on a map of an observation area as shown in FIG. 6, the seismofocal zone can be estimated to be at point at which the telluric currents within the observation area are concentrated, and a large-magnitude earthquake can be estimated at a shallow layer directly below the observation area.

Figure 7:
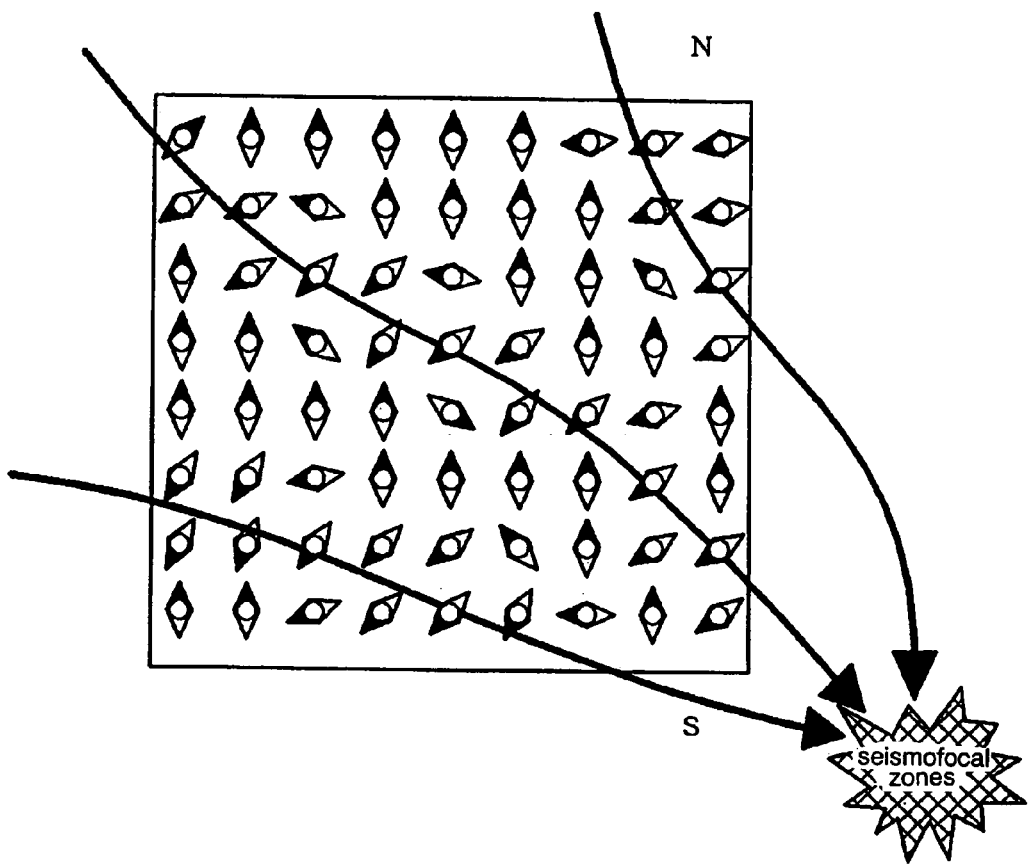
FIG. 7 shows an example of telluric current induction fields and telluric currents that have been measured.

Further, when the telluric current induction fields and telluric currents are plotted on a map of the observation area as shown in FIG. 7, the seismofocal zone can be estimated at a shallow layer in a Vicinity outside the observation area.

Figure 8:
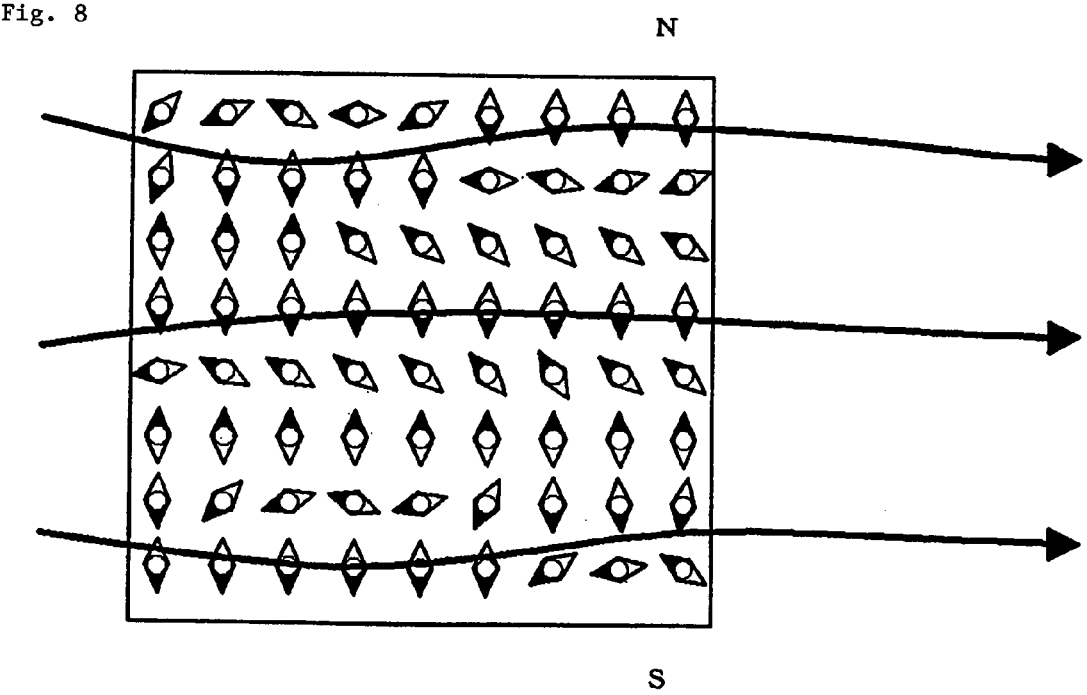
FIG. 8 shows an example of telluric current induction fields and telluric currents that have been measured.

When the telluric current induction fields and telluric currents are plotted on a map of the observation area as shown in FIG. 8, the seismofocal zone can be estimated in a remote shallow layer outside the observation area, or in a plurality of close shallow layer points.

Figure 9:
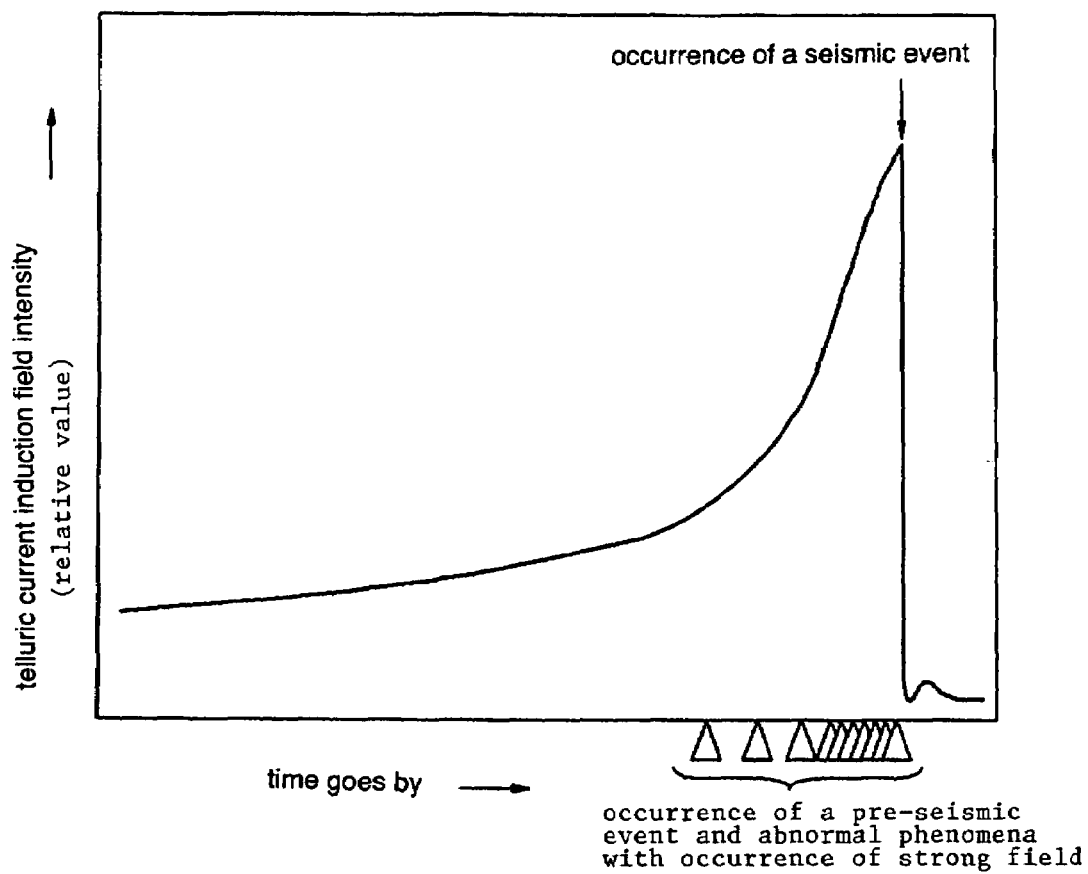
FIG. 9 shows an example of the pattern of change in telluric current induction field intensity.

FIG. 9 shows an example of the pattern of change in telluric current induction field intensity. In this case, the telluric current induction field intensity is a relative value.

Typically, at a point close to the limit of elasticity that immediately precedes the breakdown of the rock mass of a seismofocal zone, the telluric current rises rapidly with the rapid rise in piezoelectric voltage. A stagnation of telluric current is then observed that accompanies the piezoelectric voltage saturation that immediately precedes plastic deformation, following which, the piezoelectric voltage vanishes with the release of pressure that is simultaneous with the breakdown of the rock mass, and the telluric current also disappears instantaneously.

In addition, the transition in telluric current over time is specified only by the plasticity of the rock mass and relative vector speed of the two plates and has no relation to the distance from the observation points to the seismofocal zone; and since the telluric current induction fields are generated by telluric currents, observing the transition in telluric current induction field intensity over time by fixed-point observation enables an estimation of the transition of telluric currents over time.

In this case, storing past telluric current induction field intensity change patterns of the environs of a seismofocal zone that occurs in a specific identical plate boundary plane enables extraction of telluric current induction field intensity change patterns up to immediately preceding the plastic deformation (occurrence of an earthquake) of the seismofocal zone. Accordingly, if the plates of an estimated seismofocal zone that is under observation can be specified, comparison and collation with past telluric current induction field intensity change patterns enables the estimation of an estimated time and seismic intensity until the plastic deformation of the rock mass (occurrence of the earthquake).

In addition, transition points of a curve function that indicates change in the telluric current induction field intensity can be set and the time until the plastic deformation of the rock mass (earthquake occurrence) then estimated based on the telluric current induction field intensity at a point close to the limit of elasticity of the rock mass. Further, the maximum value that is reached by the telluric current induction field intensity can be estimated and the equivalent seismic intensity then estimated according to this maximum value.

In the foregoing explanation, magnetic force line sensors are installed in vehicles, ships, and existing fixed structures and magnetic field data are collected for each point within the observation area, but as another working example, magnetic force line sensors and GPS position detectors may be incorporated into mobile telephones or portable terminals, which may then use their own communication capabilities to transmit observation data. In such a case, the observation data may be periodically transmitted automatically, and if transmission fees are not charged, observation data can be collected from many points over a wide range without imposing any financial burden on users.

Alternatively, if acceleration sensors are installed together with magnetic force line sensors on existing fixed structures and observation data then transmitted automatically when the acceleration sensors detect earthquake motion, magnetic field data can be collected at the time of occurrence of foreshocks that precede a main shock, whereby data effective for earthquake prediction can be obtained.

Still further, if acceleration sensors together with magnetic force line sensors are incorporated in mobile units such as vehicles or ships as well as in mobile telephones or portable terminals, observation data may be automatically transmitted when the acceleration sensors detect a stationary state of at least a fixed time interval.

As described in the foregoing explanation, earthquakes can be accurately predicted by collecting magnetic field data at a multiplicity of points within an observation area, estimating telluric current induction fields, estimating telluric currents based on the telluric current induction fields that have been estimated, and then analyzing these estimation results.

The invention claimed is:

1. An earthquake prediction method comprising:
observing magnetic field vectors of magnetic fields within an observation area;
estimating telluric current induction field vectors and telluric currents based on vector differences between the observed magnetic field vectors and a geomagnetic vector;
collating and comparing a change over time of the estimated telluric currents and a state of the estimated telluric currents within the observation area, with past patterns of change over time of telluric currents and a state of the telluric currents; and estimating a seismofocal zone, time of occurrence, and seismic intensity of a seismic event based on the comparison.

2. The earthquake prediction method according to claim 1, further comprising:

eliminating a magnetic field noise component at observation points from observed magnetic fields;

finding an amount of divergence between a direction of a magnetic fields from which said magnetic field noise component has been eliminated and a direction of true north; and estimating said telluric current induction field vectors based on vector differences between observed magnetic field vectors from which said magnetic field noise component has been eliminated and a geomagnetic vector that has been corrected to true north.

3. The earthquake prediction method according to claim 2, wherein estimating telluric current induction field vectors and telluric currents comprises:

plotting said estimated telluric current induction field vectors on a map; and estimating said telluric currents by joining points on the map at which geomagnetic abnormalities are recognized and applying Ampere's right-handed screw rule.

4. The earthquake prediction method according to claim 1, wherein estimating telluric current induction field vectors and telluric currents comprises:

plotting said estimated telluric current induction fields on a map; and estimating a seismofocal zone at an area in which said estimated telluric currents are concentrated.

5. The earthquake prediction method according to claim 4, further comprising:

gathering past data of telluric current induction field intensities of the estimated seismofocal zone;

generating a telluric current induction field intensity change pattern that indicates change over time;

collating and comparing the telluric current induction field density change pattern with past telluric current induction field intensity change patterns that have been stored; and estimating said time of occurrence and seismic intensity of a seismic event.

6. An earthquake prediction method according to claim 2, wherein:

said magnetic field noise component is a change in magnetic field that is observed at fixed time intervals at a fixed observation point; and eliminating said magnetic field noise component comprises analyzing characteristics of a pattern of the change in magnetic fields that is observed at fixed time intervals as a fixed observation point and extracting the magnetic field noise component from observed magnetic fields.

7. An earthquake prediction method according to claim 2, wherein estimating said telluric currents comprises using Ampere's right-handed screw rule based on said estimated telluric current induction field vectors of a plurality of points.

8. An earthquake prediction method according to claim 2, wherein estimating said telluric currents comprises using Ampere's right-handed screw rule based on said estimated telluric current induction field vectors of a plurality of points that form a loop.

* * * * *